Patented Nov. 26, 1946

2,411,631

UNITED STATES PATENT OFFICE

2,411,631

STABLE, SUPERSATURATED SOLUTIONS OF SACCHARIDE DERIVATIVES OF THE SUPRARENAL CORTICAL HORMONE SERIES AND PROCESS OF MAKING SAME

Karl Miescher, Riehen, and Charles Meystre, Basel, Switzerland, assignors to Ciba Pharmaceutical Products Incorporated, Summit, N. J., a corporation of New Jersey No Drawing. Application June 11, 1943, Serial No. 490,536. In Switzerland December 24, 1942

9 Claims. (Cl. 167—77)

According to K. Miescher, W. H. Fischer and Ch. Meystre (Helvetica Chimica Acta, vol. 25, page 40, 1942), the solubility of desoxycorticosterone in water is increased about ten times to 0.12 percent by converting it into the β-glucoside. See also the Miescher et al. Patent No. 2,270,379, granted on Jan. 20, 1942. For practical purposes, however, in particular for injection therapy, often still more concentrated solutions are desired. It has now been found that stable, super-saturated solutions of saccharide derivatives of the suprarenal cortical hormone series can be obtained if these derivatives are dissolved in aqueous solutions of inert, easily water-soluble organic compounds containing oxygen, with exclusion of any crystallization nucleus.

Such solutions remain surprisingly stable for a long time even at low temperatures; after the addition of a small crystal of the saccharide derivative, however, crystallization of the supersaturated solutions soon starts. The latter should therefore be stored in sealed ampules. If the solutions prepared as described in the process are diluted with water, there is no separation of the saccharide derivative contained. This is surprising as it is known that, for example, free desoxycorticosterone or barbituric acids which are brought into aqueous solution by means of suitable hydrotropic agents, for example by means of urea, are precipitated immediately on dilution with water.

The following saccharide derivatives of the suprarenal cortical hormone series may, for example, be used: monosaccharide derivatives, such as the α- and β-glucosides, galactosides, mannosides or arabinosides, polysaccharide derivatives such as maltosides, lactosides, lactosidoglucosides, etc. of, for example, desoxycorticosterone, corticosterone, dehydrocorticosterone, anhydrocorticosterone or corresponding compounds hydroxylated in the 17-position.

As solvents for the saccharide derivatives named, the following are suitable: aqueous solutions of mono- or poly-alcohols, such as glycol, glycerine, erythritol or mannitol, of monosaccharides and sugar-like polysaccharides, such as glucose, galactose, fructose, lactose, maltose, sucrose or raffinose and finally of further inert, easily water-soluble organic compounds containing oxygen, such as dioxane or polymers of ethylene oxide, or of mixtures of such compounds. Especially to be recommended on account of their good tolerability are solutions of certain members of the sugar series, i. e. of polyalcohols, monosaccharides and sugar-like polysaccharides, and amongst these physiologically occurring sugars in particular. The concentration of these substances is chosen as low as possible and does not exceed in general 20–25%.

The solutions obtained are to be used therapeutically.

The following examples illustrate the invention but are not to be regarded as limiting it in any way, the parts being by weight:

Example 1

1 part of the β-d-glucoside of desoxycorticosterone is brought into solution in 100 parts of a 10% d-glucose solution in water by heating in a boiling water-bath. The solution obtained is filled into ampules. The latter are sealed and sterilized in the usual way by heat. The ampules prepared in this way remain clear and are very stable. No precipitation occurs on pouring the solution into water.

Aqueous solutions of other sugars such as sucrose, lactose, etc. can also be used with the same success.

Example 2

2 parts of the β-d-glucoside of desoxycorticosterone are dissolved in 100 parts of a 10% solution of glycol in water as in Example 1. The solution is filled into ampules and sterilized. Instead of glycol, other polyalcohols or their derivatives, e. g. ethers, and also monoalcohols may be used.

Example 3

0.5 part of the β-lactoside of desoxycorticosterone is dissolved in 100 parts of a 20% solution of glycerine in water as described in Example 1. The solution is filled into ampules and sterilized. It is stable even on cooling.

Example 4

2 parts of the β-d-glucoside of corticosterone (prepared by reaction of corticosterone and tetraacetylbromoglucose in the presence of silver carbonate and saponification of the tetra-acetate obtained) are dissolved hot in 100 parts of a 15% aqueous d-glucose solution. The solution is filled into ampules and sterilized in the usual way after sealing. It is stable.

In a similar way, solutions of glucosides of other active compounds of the suprarenal cortical hormone series, such as, for example, dehydrocorticosterone, can be prepared. The glucosides themselves are obtained analogously to that of corticosterone.

What we claim is:

1. A process for the manufacture of a stable, supersaturated solution of a saccharide derivative of the suprarenal cortical hormone series, which comprises dissolving the said saccharide derivative in an aqueous solution containing, as hydrotropic agent, a physiologically inert proportion of a saccharide, with exclusion of any crystallization nucleus, said hydrotropic agent being present in a concentration sufficient to effect stabilization of the solution but not exceeding about 20-25%.

2. A process for the manufacture of a stable, supersaturated solution of a monosaccharide derivative of the suprarenal cortical hormone series, which comprises dissolving the said monosaccharide derivative in an aqueous solution containing, as hydrotropic agent, a physiologically inert proportion of a saccharide, with exclusion of any crystallization nucleus, said hydrotropic agent being present in a concentration sufficient to effect stabilization of the solution but not exceeding about 20-25%.

3. A process for the manufacture of a stable, supersaturated solution of a glucose derivative of the suprarenal cortical hormone series, which comprises dissolving the said glucose derivative in an aqueous solution containing, as hydrotropic agent, a physiologically inert proportion of a saccharide, with exclusion of any crystallization nucleus, said hydrotropic agent being present in a concentration sufficient to effect stabilization of the solution but not exceeding about 20-25%.

4. A stable, supersaturated aqueous solution of a saccharide derivative of the suprarenal cortical hormone series containing, as hydrotropic agent, a physiologically inert proportion of a saccharide, said hydrotropic agent being present in a concentration sufficient to effect stabilization of the solution but not exceeding about 20-25%.

5. A stable, supersaturated aqueous solution of a monosaccharide derivative of the suprarenal cortical hormone series containing, as hydrotropic agent, a physiologically inert proportion of a saccharide, said hydrotropic agent being present in a concentration sufficient to effect stabilization of the solution but not exceeding about 20-25%.

6. A stable, supersaturated aqueous solution of a glucose derivative of the suprarenal cortical hormone series containing, as hydrotropic agent, a physiologically inert proportion of a saccharide, said hydrotropic agent being present in a concentration sufficient to effect stabilization of the solution but not exceeding about 20-25%.

7. A stable, supersaturated aqueous solution of a glucoside of desoxycorticosterone containing, as hydrotropic agent, a physiologically inert quantity of glucose, said hydrotropic agent being present in a concentration sufficient to effect stabilization of the solution but not exceeding about 20-25%.

8. A process for the manufacture of a stable, supersaturated solution of a glucoside of desoxycorticosterone, which comprises dissolving the said glucoside in an aqueous solution containing, as hydrotropic agent, about 10% of glucose.

9. A stable, supersaturated aqueous solution of a glucoside of desoxycorticosterone containing, as hydrotropic agent, about 10% of glucose.

KARL MIESCHER.
CHARLES MEYSTRE.